(12) United States Patent
Enriquez et al.

(10) Patent No.: US 10,535,077 B2
(45) Date of Patent: Jan. 14, 2020

(54) VALUE-ADDED SERVICES DATA AND PROTOCOL AND TRANSACTIONS INVOLVING VEHICLE SPECIFIC DATA

(71) Applicant: VISA INTERNATIONAL SERVICE ASSOCIATION, San Francisco, CA (US)

(72) Inventors: Martin Enriquez, San Francisco, CA (US); Chandra Srivastava, San Francisco, CA (US); Joseph Bjorn Ovick, San Francisco, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 621 days.

(21) Appl. No.: 14/933,756

(22) Filed: Nov. 5, 2015

(65) Prior Publication Data

US 2016/0125458 A1 May 5, 2016

Related U.S. Application Data

(60) Provisional application No. 62/075,522, filed on Nov. 5, 2014.

(51) Int. Cl.
*G06Q 30/00* (2012.01)
*G06Q 30/02* (2012.01)

(52) U.S. Cl.
CPC ..... *G06Q 30/0253* (2013.01); *G06Q 30/0226* (2013.01); *G06Q 30/0265* (2013.01); *G06Q 30/0267* (2013.01)

(58) Field of Classification Search
CPC ..................................................... G06Q 30/02
(Continued)

(56) References Cited

U.S. PATENT DOCUMENTS

| 2008/0147561 A1* | 6/2008 | Euchner | G06Q 20/14 705/64 |
| 2013/0073377 A1* | 3/2013 | Heath | G06Q 30/02 705/14.39 |

(Continued)

FOREIGN PATENT DOCUMENTS

WO    WO-2013029385 A1 *    3/2013    ....... H04B 10/25752

OTHER PUBLICATIONS

International Search Report and Written Opinion in corresponding PCT Application No. PCT/US15/59310, dated Jan. 28, 2016, 9 pages.

(Continued)

*Primary Examiner* — Sun M Li
(74) *Attorney, Agent, or Firm* — Loeb & Loeb LLP

(57) ABSTRACT

A method for enabling a value-added transaction involving a vehicle and a merchant via a mobile device is disclosed. Merchant information may be broadcasted from a merchant terminal. Vehicle specific data may be received at the merchant terminal identifying the vehicle in response to the broadcasted merchant information. Transaction data may be provided to the mobile device to initiate an intended transaction. Payment data may be received from the mobile device at the merchant terminal in response to the provided transaction data. Before completing the intended transaction, a value-added transaction offer may be provided to the mobile device. In response to the provided value-added transaction offer, an acceptance of the value-added transaction offer may be received. The intended transaction and the value-added transaction offer may be completed as a single transaction.

20 Claims, 5 Drawing Sheets

Payment Processor Participates Throughout the Commerce Value Chain

Pre
• Location based services
• Coupons / offers
• Contextual marketing
• Ordering Pay
• Frictionless
• Secure
• Multi-factor authentication
• Line busting Post
• Loyalty program integration / registration
• CRM

(58) Field of Classification Search
USPC .......................................... 705/14.4, 14.73
See application file for complete search history.

(56) References Cited

U.S. PATENT DOCUMENTS

| | | |
|---|---|---|
| 2013/0254097 A1 | 9/2013 | Marathe |
| 2013/0346317 A1 | 12/2013 | Korkis |
| 2014/0067195 A1 | 3/2014 | James et al. |
| 2014/0136329 A1* | 5/2014 | Chang ................ G06Q 30/0265 |
| | | 705/14.62 |
| 2014/0279535 A1 | 9/2014 | Fadler |
| 2015/0100448 A1* | 4/2015 | Binion ................... G06Q 30/08 |
| | | 705/26.3 |

OTHER PUBLICATIONS

European Patent Office Communication pursuant to Article 94(3) EPC for Application No. EP15857852.6, dated Sep. 12, 2019, 9 pages.

* cited by examiner

VALUE-ADDED SERVICES DATA AND PROTOCOL AND TRANSACTIONS INVOLVING VEHICLE SPECIFIC DATA

CROSS REFERENCE TO RELATED APPLICATIONS

This application claims the benefit of, and priority to, U.S. Provisional Application No. 62/075,522 filed Nov. 5, 2014, entitled "Value-Added Services Data And Protocol And Transactions Involving Vehicle Specific Data," the entire content of which is incorporated herein by reference.

BACKGROUND

Mobile devices have fundamentally changed our way of life in the information age. The ever-expanding capabilities of mobile device applications enable users to perform tasks that used to tie people to a specific location, such as one's desk. In addition, mobile applications create additional opportunities to change the way transactions may be performed.

Conventional mobile commerce providers do not seamlessly integrate payments and transactions. Current implementations fail to provide a coherent and systematic approach to mobile applications, payments, and transactions. In addition, existing approaches treat offers as a separate or after-thought transaction.

SUMMARY

The following presents a simplified summary of the present disclosure in order to provide a basic understanding of some aspects of the disclosure. This summary is not an extensive overview. It is not intended to identify key or critical elements of the disclosure or to delineate its scope. The following summary merely presents some concepts in a simplified form as a prelude to the more detailed description provided below.

Example embodiments improve over existing purchasing experiences by using the VAS data specification to provide VAS offers in transactions during the interval between initiation and completion of a transaction. Aspects of embodiments overcome the deficiencies of prior approaches by integrating payments and value-added services (VAS) as consumers are shopping at retailers and other merchants. In one example, consumers are presented with value-added offers or incentives to add additional purchases to an existing intended purchase before completion of the transaction. As such, aspects of embodiments provide a streamlined process to complete seemingly multiple transactions as a single transaction.

Aspects of embodiments enable cloud-based payment program support capabilities, such as Host Card Emulation (HCE) and QR codes, to open up new opportunities for various participants in the payment and retail ecosystem to offer new value-added services (VAS) to consumers. In one example, embodiments include a merchant Value-Added Services (VAS) data specification to provide a standardized approach that provides interoperability while maintaining flexibility for service providers to innovate. In one example, the merchant Value-Added Services (VAS) data specification enables non-payment data to be transferred between a mobile application and a merchant's point-of-sale (POS) system in a standard manner.

According to additional aspects, the merchant Value-Added Services (VAS) data specification enables a variety of services that retailers, acquirers, networks, issuers, wallet providers, and third parties want to provide to consumers. For example, value-added services (VAS) in the mobile and POS-world involve multiple components that work together. Some examples of value-added services include loyalty programs for earning and redeeming rewards, offers redemption, and mobile ordering and pickup at a retail location. Value-added services may be provided by applications implemented at a retail POS or by a third-party service integrated at a POS. These services may be provided in real-time at the time of a payment transaction or may be provided post transaction. To use a value-added service, for example, the merchant Value-Added Services (VAS) data may be passed from consumers to a POS. According to one embodiment, the merchant VAS data includes the data that links consumers with a value-added service and is passed from the consumer to the merchant's POS system.

A method for enabling a value-added transaction involving a vehicle and a merchant via a mobile device is disclosed. Merchant information may be broadcasted from a merchant terminal. Vehicle specific data may be received at the merchant terminal identifying the vehicle in response to the broadcasted merchant information. In response to the received vehicle specific data, transaction data may be provided to the mobile device to initiate an intended transaction. Payment data may be received from the mobile device at the merchant terminal in response to the provided transaction data. Before completing the intended transaction, a value-added transaction offer may be provided to the mobile device. In response to the provided value-added transaction offer, an acceptance of the value-added transaction offer may be received. The intended transaction and the value-added transaction offer may be completed as a single transaction.

BRIEF DESCRIPTION OF THE DRAWINGS

The invention may be better understood by references to the detailed description when considered in connection with the accompanying drawings. The components in the figures are not necessarily to scale, emphasis instead being placed upon illustrating the principles of the invention. In the figures, like reference numerals designate corresponding parts throughout the different views.

Figure 1:
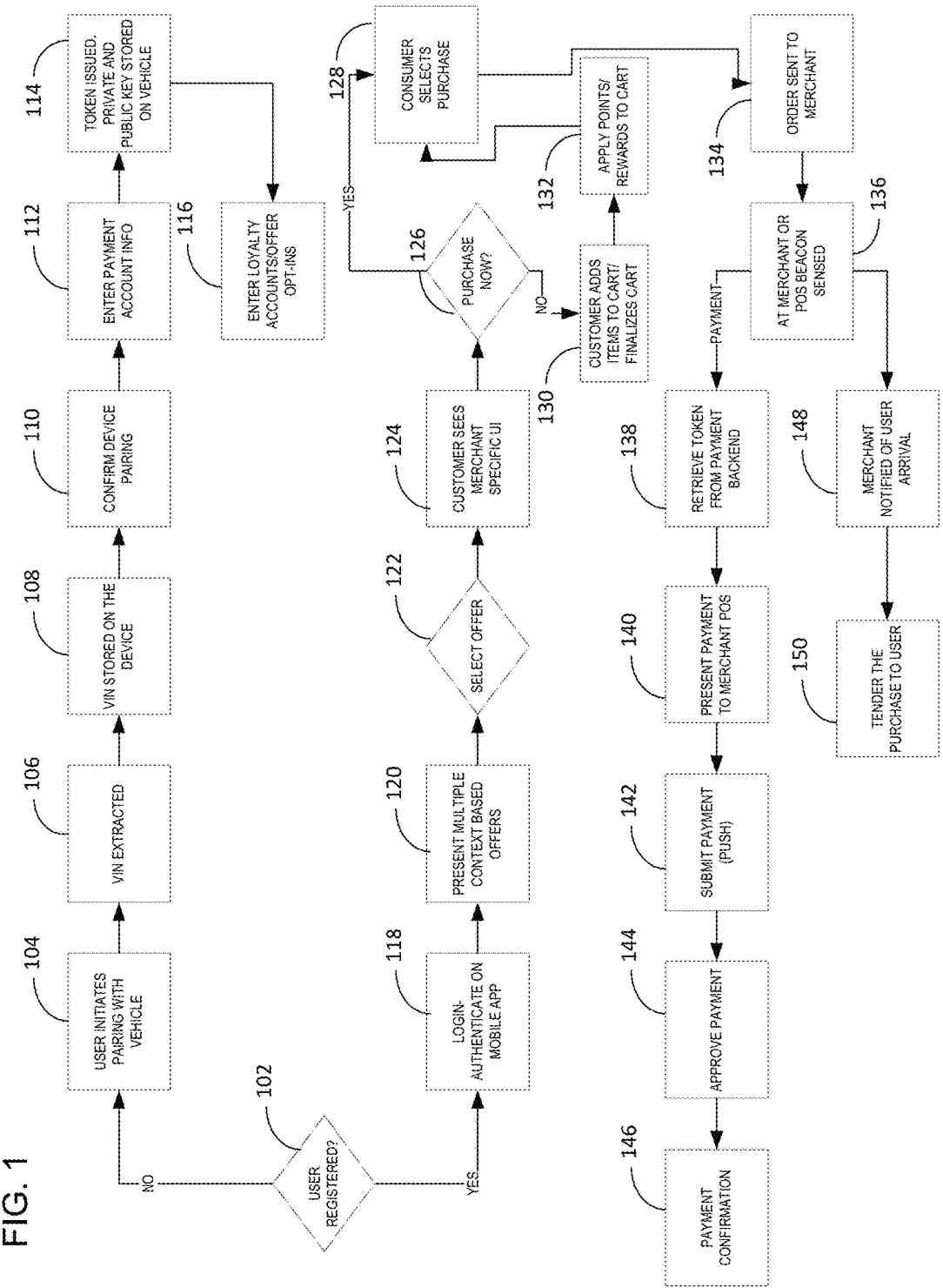
FIG. 1 is a flow diagram illustrating a value-added services data transaction in a vehicular setting according to one embodiment.

The accompanying drawings, which are incorporated in and form a part of the specification, illustrate embodiments of the present invention and, together with the description, serve to explain the principles of the invention.

DETAILED DESCRIPTION

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

Embodiments provide a protocol or platform for merchant value-added services by defining data formats for exchanging value-added services data. The protocol may be used to offer enhanced verification using additional data such as vehicle specific data and may be used to offer additional goods and services to a consumer either on a mobile device or on a display in the vehicle itself. As a result, superior verification and easier transactions may be obtained.

In one embodiment, value-added services (hereinafter "VAS") data includes, without limitation, transaction data, payment data, and non-payment data. For example, transaction data may include order number, transaction amount, a merchant identifier (ID), a customer ID, etc. In another example, payment data may include payment method, time of payment, payment network, location of payment, etc. Non-payment data may include customer address, customer loyalty program number, phone number, email address, etc. In another example, the VAS data may include offer or other incentive program data or information that may later give rise to additional transaction data and non-payment data. These additional transaction data and non-payment data may be integrated into the VAS data specification such that overall transaction experience for the consumers is as if a single transaction took place, instead of multiple transactions and payments.

In any transaction, there may be a merchant or seller that provides goods or services to a customer or buyer who will consume such goods or services. In certain situations, there may be an intermediate party for handling of payment if payment for goods or services is not done face-to-face via cash transaction or bartering. Hence, as will be discussed below, aspects of the example embodiments may incorporate payment network provider(s) with specific, sometimes secure networks, to assist in the completion of a transaction. As such, the example embodiments may provide a set of data fields for merchants to provide VAS data.

Table 1 below shows a set of merchant value-added services data fields that may be used according to one embodiment:

| | Value-Added Services ("VAS") Data | Tag | Description | Format |
|---|---|---|---|---|
| 1 | Merchant Proprietary VAS data | DF01 | A merchant and Mobile Application may be responsible for defining the format and content. | Variable (up to 256) |
| 2 | Payment Account ID | DF02 | The Payment Account ID may be associated with the consumer's primary account number (PAN) and may be linked to one or more tokens, which are issued by a Token Service Provider. | 16 digits |
| 3 | Digital Wallet Provider ID (DWP ID) | DF03 | This element may identify a Digital Wallet Provider. A merchant may provide discounts and/or rewards and value to consumers based on their relationship with the Digital Wallet Provider. | 8 digits |

-continued

| | Value-Added Services ("VAS") Data | Tag | Description | Format |
|---|---|---|---|---|
| 4 | Merchant-Assigned Consumer Loyalty ID | DF04 | This Loyalty ID may be issued by the merchant to the consumer and is processed by the POS. | Alphanumeric (variable up to 16) |
| 5 | Telephone Number | DF05 | The consumer's telephone number, which may be used as an alternate Loyalty ID for enrollment or merchant messaging. The POS and the Mobile Application follow Personally Identifiable Information (PII) guidelines to store the consumer's telephone number. | 13 digits |
| 6 | Partner Loyalty ID | DF06 | The Loyalty ID of the merchant's partner, with whom consumers may earn rewards. | Alphanumeric (variable up to 16) |
| 7 | Email Address | DF07 | The consumer's email address may be used for receipts or enrollment. It cannot be used for QR codes due to payload size limitations, but may be used with other form factors. The POS and the Mobile Application follow PII guidelines to store the consumer's email address. | String (variable up to 256) |
| 8 | Offers (multiple) 16 is the maximum number allowed | DF10-DF1F | The coupon or offer that may be locally redeemed by the merchant POS. | Alphanumeric (variable up to 16) |
| 9 | Consumer Intent | DF08 | This field represents Consumer Intents, which may be defined as flags in the field. Two Consumer Intents are defined: 1. Intent to pay with points or rewards. 2. Intent to redeem card-linked offers in the transaction. Note: The POS may have workflow and integration to support the ability to pay with points or rewards. | |
| 10 | Order Confirmation Number | DF09 | This is the order number for remote order and pickup. | Alphanumeric (variable up to 16) |
| 11 | Employee ID | DF0A | The merchant's employees may have an Employee ID, which makes them eligible for special discounts. | Alphanumeric (variable up to 10) |
| 12 | ZIP code | DF0B | The ZIP code that may be used for the purchase card data provided at the POS. | Alphanumeric (variable up to 10) |

-continued

| Value-Added Services ("VAS") Data | Tag | Description | Format |
|---|---|---|---|
| | | The POS and the Mobile Application follow PII guidelines to store the consumer's ZIP code | |

It is to be understood that the specification in Table 1 is provided for illustration of one implementation and is not meant to be limiting. It is contemplated that the field types, lengths and contents may vary as needs and desires change. So long as all parties understand the changes in the fields, the implementations may be many and varied. Moreover, a mobile device and POS terminal may communicate messages using the data field tags described in the same order as listed above, or in any desired order. For example, the data fields may have standard identifiers for each data type that precede the actual data in the field. Thus, a VAS data set may be analyzed based on reviewing the standard data type identifier to determine what data follows the identifier. For example, scanning VAS data may be used to determine which field holds the mobile phone number by identifying a corresponding standard data type identifier.

In one embodiment, the merchant VAS data specification according to a payment network provider, such as VISA®, may include additional capabilities. For example, the merchant VAS data specification may be supported by an issuer mobile application, a merchant mobile application, and a third-party mobile application. In such an example, the data in the set of data fields shown in Table 1 may be encoded in graphical representations or symbols that may be read by a mobile device with the mobile application installed. The mobile application may capture, read, render, interpret, or otherwise determine the merchant VAS data from graphical representations or symbols. For example, the merchant VAS data may be included or embedded in a Quick Response (QR) code payload. In this example, the mobile application installed on the mobile device may retrieve or decode merchant VAS data from merchants or one or more applications or services integrated with it. In a further embodiment, the payment network provider may also assemble a QR code payload to include or encode payment credentials data for the consumer. Such QR code payload may include both merchant VAS data and the payment credentials data.

In one embodiment, the QR code payload may have a size restriction to ensure error prone scanning by the QR code reader. In another embodiment, other maximum QR code payloads may also be used. It is recommended that an assembled QR code payload does not exceed the maximum size.

Also referring to Tables 2 and 3, an Application Template (tag '61') and Common Data Template (tag '62') may also be supported. Merchant VAS data may be included in the Application Template under the VISA® AID or in the Common Data Template.

When a QR code is scanned by a QR code reader connected to a POS, it may read, decode, and validate the QR payload. Data passed in the Merchant VAS data template tag may be parsed and used for value-added services.

Merchant VAS data present in the Common Data Template may be used for all transactions, but Merchant VAS data present in the Application Template under the VISA® AID may be used only for transactions processed through VisaNet. Duplicate Merchant VAS data tags in the QR payload may not be allowed and may result in an error.

It is to be understood that from time to time, processing of a QR payload may encounter errors, etc., during parsing, reading, or assembling. The processing of data from the QR payload after parsing is outside the scope of this disclosure. The processing of data may be done per the merchant's business rules. However, the payment authorization flow may be executed even if a merchant finds an error in the merchant VAS data tags. The merchant POS may ignore the error found in the merchant VAS data and may continue with payment processing as if the merchant VAS Data Template tag is not present in the payload.

A Mobile Application that supports QR codes may provide an option to receive Merchant VAS data and insert it in a merchant VAS Data Template tag. The Mobile Application may also provide an option to the consumer to enable or disable Merchant VAS data on a per-transaction basis.

Merchants that support the QR code option may ensure that QR code readers used in their stores process and pass the Merchant VAS Data Template tag. The processing of Merchant VAS data at the POS is outside the scope of this disclosure as each merchant may provide additional services based on the current specification.

Table 2 lists the specifications for a mobile application to support QR code data associated with the VAS data according to one implementation:

| Specification # | Specification Description |
|---|---|
| VAS-MA-QR-1 | The Merchant VAS Data Template tag may be part of the payload associated with the AID. |
| VAS-MA-QR-2 | The Mobile Application may provide an option to integrate with value-added services to receive Merchant VAS data for the QR payload. |
| VAS-MA-QR-3 | The Mobile Application may provide an option for consumers to enable and disable Merchant VAS data on a per-transaction basis. |
| VAS-MA-QR-4 | The Mobile Application may ensure that the QR code payload does not exceed the maximum recommended size for a QR code payload. |
| VAS-MA-QR-5 | Merchant VAS data may be formatted as per Table A-1, Merchant Value-Added Services Data with QR Code. |

Table 3 provides Point-of-Sale system and Reader specification for QR code data associated with the VAS data, e.g., for merchants:

| Specification # | Specification Description |
|---|---|
| VAS-POS-QR-1 | The QR code reader may process and pass the tags defined below in Table A-1, VISA ® Merchant Value-Added Services Data with QR Code, and the POS system will process the applicable data. |
| VAS-POS-QR-2 | If the VISA ® AID is not used for payment processing, then VAS data under the Common Data Template may be used. |
| VAS-POS-QR-3 | If the VISA ® AID is used for payment processing, then VAS data under both Application Template and Common Data Template may be used. |
| VAS-POS-QR-4 | The merchant POS may send the payment for authorization even if the POS detects an error in the Merchant VAS data tags. |

The example embodiments may also support the inclusion of optional Merchant VAS data elements in the QR payload. Inclusion of Merchant VAS data elements in the QR code payload may be supported as shown in Table A-1.

TABLE A-1

Merchant VAS Data in the QR Code Payload

| Tag | Value |
|---|---|
| 61 | Application Template |
| xxxx | (Other data elements) |
| BF64 | Merchant VAS Data Template |
| DFxx | One or more Merchant VAS data elements (see Table 2) |
| 61 | Application Template |
| xxxx | (Other data elements) |
| 62 | Common Data Template |
| BF64 | Merchant VAS Data Template |
| DFxx | One or more Merchant VAS data elements (see Table 2) |

In another embodiment, the data in the set of data fields shown in Table 1 may be transmitted using wireless signals or waves. For example, the wireless signals may be signals in compliance with Wi-Fi, Bluetooth, Near-Field Communication (NFC) technology, cellular technology, iBeacon and other wireless signal specifications. In the example where NFC technology or device is used, merchants and mobile application developers may have two options to enable value-added services for their consumers over NFC: 1. Limited option or 2. Extensive option. Both options work for Host Card Emulation (HCE)- and secure element (SE)-based implementations and may be supported on qVSDC-enabled NFC readers.

For the Limited Option, in one example, mobile applications may send Merchant VAS data in an interoperability setting. For example, in a VISA® payment network, mobile applications may send merchant VAS data in existing Card Holder Name (CHN) and Customer Exclusive Data (CED) VISA® payWave® tags. In this example, the format and length of CHN and CED may be defined in the VISA® Contactless Payment Specification. Other formats and lengths may also be used. Mobile applications may send any tag defined in Table 2-1 in CHN and CED tag values. For example, if a mobile application wishes to send the Loyalty ID in CHN the data stream may look like the following example:

```
....<CHN Tag> <CHN Length> <Merchant Assigned Consumer
Loyalty ID TLV>....
    ....5F20 08 DF04 05 1234567890........
    '5F20' : CHN tag
    '08' : Length of data in CHN tag
    'DF04' : Merchant Assigned Consumer Loyalty ID tag
    '05' : Length of Loyalty ID
    '1234567890' : Loyalty ID value
```

On the merchant POS system, data may be parsed and used for value-added services if tag values read in the CHN and CED fields match one of the tags listed in Table 2-1. The processing of data may be done as per the merchant's business rules.

The payment authorization flow may be executed even if a merchant finds an error in the Merchant VAS data tags. The merchant POS system may ignore the error found in the Merchant VAS data and continue with payment processing as if there is no Merchant VAS data available in the CHN and/or CED tags.

Mobile applications that support the Limited Option may provide an option to receive the Merchant VAS data and insert it in the CHN and CED VISA® payWave® tags. The Mobile application may also provide an option to the consumers to enable or disable Merchant VAS data on a per-transaction basis. CHN and CED fields may be cleared after every transaction in the Mobile Application.

Impact on Merchants

Merchants that support the Limited Option may ensure that their terminals at a minimum support the VISA® payWave® 1.4.2 process and pass CHN and CED tags to the POS. For the Extensive Option, mobile applications may be able to send more data elements or tags to a reader than they are able to do with the Limited Option.

Merchant VAS data may be sent under tag 'BF64' (Merchant VAS Data Template). The Merchant VAS Data Template tag may be part of the payload associated with the VISA® AID. Please refer to Table B-1 and its description herein for more details.

On the merchant POS system, data passed in the Merchant VAS Data Template tag may be parsed and used for value-added services. The processing of data may be done per a merchant's business rules. The payment authorization flow may be executed even if the merchant finds an error in the Merchant VAS data tags. The merchant POS system may ignore any errors found in the Merchant VAS data and continue with payment processing as if Merchant VAS Data Template tag is not present in the payload.

Mobile Applications that support the Extensive Option may provide an option to receive the Merchant VAS data and insert it in the Merchant VAS Data Template tag. The Mobile Application may also provide an option to the consumer to enable or disable Merchant VAS data on a per-transaction basis.

From the merchants' perspective, merchants that support the Extensive Option may ensure that the terminals supporting qVSDC are used to process and pass the Merchant VAS Data Template tag.

Table 4 lists the specifications for a mobile application to support NFC data that may be associated with the VAS data:

| Specification # | Specification Description | Limited Option | Extensive Option |
|---|---|---|---|
| VAS-MA-NFC-1 | The Merchant VAS Data Template tag may be part of the payload associated with the VISA ® AID | Y | Y |
| VAS-MA-NFC-2 | The Mobile Application may provide an option to receive Merchant VAS data. | Y | Y |
| VAS-MA-NFC-3 | The Mobile Application may provide an option for consumers to enable or disable Merchant VAS data on a per-transaction basis. | Y | Y |

-continued

| Specification # | Specification Description | Limited Option | Extensive Option |
|---|---|---|---|
| VAS-MA-NFC-4 | The Mobile Application may ensure that the length of the data doesn't exceed the maximum allowed length of the CHN and CED tags. | Y | N |
| VAS-MA-NFC-5 | Merchant VAS data may be formatted as per Table B-1, VISA ® Merchant Value-Added Services Data for NFC. | N | Y |
| VAS-MA-NFC-6 | The Mobile Application may meet VISA ® payWave ® timing requirements with or without Merchant VAS data. | Y | Y |

Table 5 lists the specifications for a POS system and reader to support NFC data that may be associated with the VAS data:

| Specification # | Specification Description | Limited Option | Extensive Option |
|---|---|---|---|
| VAS-POS-NFC-1 | The reader may process and pass CHN and CED tags to the POS. | Y | N |
| VAS-POS-NFC-2 | The reader may process and pass tags defined in Table B-1, VISA ® Merchant Value-Added Services Data for NFC. | Y | Y |
| VAS-POS-NFC-3 | The reader may meet VISA ® payWave ® timing requirements. | Y | Y |
| VAS-POS-NFC-4 | The merchant POS may send the payment for authorization even if the POS detects an error in the Merchant VAS data tags. | Y | Y |
| VAS-POS-NFC-5 | If the reader supports the Extensive Option (see Section 4.2, Extensive Option) then it may also support the Limited Option (see Section 4.1, Limited Option). | N | Y |

Merchant VAS data elements that may be present in the first Application Template may be used when the first application may be used to conduct the transaction. Merchant VAS data elements that are present in the Common Data Template may be used regardless of whether the first application or the second application is used to conduct the transaction. For example, if the second application in the QR code payload is used to conduct the transaction, only the Merchant VAS data elements present in the Common Data Template (if there are any) may be used.

While different Merchant VAS data elements may be present in the first Application Template and in the Common Data Template, the same Merchant VAS data element may not be present in both. For example, the Merchant Proprietary VAS Data (tag 'DF01') may be present in either the first Application Template or in the Common Data Template, but not in both.

Mobile applications that use Merchant VAS data may include an additional record that contains the tags used for the specific transaction. The record identification is '0104' and contains one or more of the data elements described in Table 2-1 of this document. The presence of an additional record impacts the AFL as defined in Table 1 or Table 2 of the VISA® Cloud-Based Payments Contactless Specification (VCPCS).

For mobile application transactions without offline data authentication (ODA), the value of Application File Locator may be '08030400'. For Mobile Application transactions with ODA, the value of the Application File Locator may be '0804040010020300'.

A sample record (containing Merchant VAS data tags), may be defined in Table B-1. This record may be in addition to the records defined for the standard records. Note that Merchant VAS data may not be supported for MSD transactions.

TABLE B-1

Mobile Application Merchant VAS Data for VISA ® payWave ® Transactions

| Command | Data Element Name | Tag ID | M/O | Data Source Value |
|---|---|---|---|---|
| Read Record ("0104") | Record Template | 70 | M | Fixed |
|  | Merchant VAS Data Template | BF64 | M | Fixed |
|  | Merchant Propriety VAS Data | DF01 | O | As defined by the merchant |
|  | Payment Account ID | DF02 | O | As defined by the merchant |
|  | Digital Wallet Provider ID | DF03 | O | As defined by the merchant |
|  | Merchant-Assigned Consumer Loyalty ID | DF04 | O | As defined by the merchant |
|  | Telephone number | DF05 | O | As defined by the merchant |
|  | Partner Loyalty ID | DF06 | O | As defined by the merchant |
|  | Email Address | DF07 | O | As defined by the merchant |
|  | Consumer Intent | DF08 | O | As defined by the merchant |
|  | Order Confirmation Number | DF09 | O | As defined by the merchant |
|  | Employee ID | DF0A | O | As defined by the merchant |
|  | ZIP Code | DF0B | O | As defined by the merchant |
|  | Offer(s) | DF1x | O | As defined by the merchant |

In one embodiment, Table C-1 provides data elements for the merchant VAS data template and the merchant VAS data fields:

| Name (Format; Tag; Length) | Description | Values |
|---|---|---|
| F: b<br>T: BF64<br>L: var. | A constructed data template that contains BER-TLV coded data elements representing Merchant Value-Added Services (VAS) data. | The following context-specific tags are defined in this document for the Merchant VAS Data Template and zero or more of the listed data elements may be present in the Merchant VAS Data Template:<br>'DF01': Merchant Proprietary VAS Data<br>'DF02': Payment Account ID<br>'DF03': Digital Wallet Provider ID<br>'DF04': Merchant Assigned |

| Name (Format; Tag; Length) | Description | Values |
|---|---|---|
| | | Consumer Loyalty ID 'DF05': Telephone Number 'DF06': Partner Loyalty ID 'DF07': Email Address 'DF08': Consumer Intent 'DF09': Order Confirmation Number 'DF0A': Employee ID 'DF0B': ZIP Code 'DF1x': Offers (up to 16, where x = '0' to 'F'). The content, length, and format of these primitive Merchant VAS data elements are defined in Table C-2. The Merchant VAS Data Template may also include additional data elements not listed in this document. |

Table C-2 provides further examples of merchant VAS data fields and data elements:

| Name (Format, Tag, Length) | Description | Values |
|---|---|---|
| Consumer Intent F: Binary T: DF08 L: Variable (4 bytes) | This field represents consumer intent, which is defined as flags in the field. Two consumer intents are defined: 1. Intent to pay with points or rewards. 2. Intent to redeem card-linked offers in the transaction. Note: The POS may have workflow and integration to pay with points or rewards. | |
| Order Confirmation Number F: Alphanumeric T: 'DF09' L: Variable (16) | This is the order number for remote order and pickup. | |
| Employee ID F: Alphanumeric T: 'DF0A' L: Variable(10) | The merchant's employees have an Employee ID, which makes them eligible for special discounts. | |
| ZIP code F: Alphanumeric T: DF0B L Variable (10) | The ZIP code that may be used for the purchase card data provided at the POS. The POS and the Mobile Application should follow PII guidelines to store the consumer's ZIP code. | |
| Offer 1 F: Alphanumeric T: DF10 L: 16 | The coupon or offer that may be locally redeemed by the merchant POS. | |
| Offer 2 F: Alphanumeric T: DF11 L: 16 | The coupon or offer that may be locally redeemed by the merchant POS. | |
| Offer 3 F: Alphanumeric T: DF12 L: 16 | The coupon or offer that may be locally redeemed by the merchant POS. | |
| Offer 4 F: Alphanumeric T: DF13 L: 16 | The coupon or offer that may be locally redeemed by the merchant POS. | |
| Offer 5 F: Alphanumeric T: DF14 L: 16 | The coupon or offer that may be locally redeemed by the merchant POS. | |
| Offer 6 F: Alphanumeric T: DF15 L: 16 | The coupon or offer that may be locally redeemed by the merchant POS. | |
| Offer 7 F: Alphanumeric T: DF16 L: 16 | The coupon or offer that may be locally redeemed by the merchant POS. | |
| Offer 8 F: Alphanumeric T: DF17 L: 16 | The coupon or offer that may be locally redeemed by the merchant POS. | |
| Offer 9 F: Alphanumeric T: DF18 L: 16 | The coupon or offer that may be locally redeemed by the merchant POS. | |
| Offer 10 F: Alphanumeric T: DF19 L: 16 | The coupon or offer that may be locally redeemed by the merchant POS. | |
| Offer 11 F: Alphanumeric T: DF1A L: 16 | The coupon or offer that may be locally redeemed by the merchant POS. | |
| Offer 12 F: Alphanumeric T: DF1B L: 16 | The coupon or offer that may be locally redeemed by the merchant POS. | |
| Offer 13 F: Alphanumeric T: DF1C L: 16 | The coupon or offer that may be locally redeemed by the merchant POS. | |
| Offer 14 F: Alphanumeric T: DF1D L: 16 | The coupon or offer that may be locally redeemed by the merchant POS. | |
| Offer 15 F: Alphanumeric T: DF1E L: 16 | The coupon or offer that may be locally redeemed by the merchant POS. | |
| Offer 16 F: Alphanumeric T: DF1F L: 16 | The coupon or offer that may be locally redeemed by the merchant POS. | |

Examples of QR Code Payload sending Merchant Value-Added Service data in an NFC or QR code payload. The data element values provided in the examples below are for illustrative purposes only and may not be indicative of typical values for each data element.

Binary Data (Shown as Hex Bytes):

```
61 3 F
    4F 07 A0 00 00 00 03 10 10
    82 02 12 34
    9F 36 02 29 32
    9F 37 04 00 00 00 00
    9F 6E 04 D3 F4 A2 AA
    9F 7C 00
    BF 64 19
        DF 04 10 33 56 38 46 78 33 39 53 28 47 47 94 02 34 45 23
        DF 0B 03 09 44 04
61 09
    4F 07 A0 00 00 00 98 08 40
62 65
    57 11 40 00 00 00 12 34 56 76 D1 51 22 01 00 07 80 80 1F
    9F 10 20 00 11 22 33 44 55 66 77 88 99 AA BB CC DD EE FF 00
    11
```

-continued

```
22 33 44 55 66 77 88 99 AA BB CC DD EE FF
9F 26 08 11 22 33 44 55 66 77 88
BF 64 21
    DF 01 05 12 34 56 78 90
    DF 03 04 11 22 33 44
    DF 10 05 55 66 77 88 99
    0DF 11 07 13 24 35 46 57 68 79
```

Example of NFC Payload:

```
70 37
  BF 64 34
    DF 04 10 33 56 38 46 78 33 39 53 28 47 47 94 02 34 45 23
    DF 0B 03 09 44 04
    DF 01 05 12 34 56 78 90
    DF 03 04 11 22 33 4 4
    DF 10 05 55 66 77 88 99
    DF 11 07 13 24 35 46 57 68 79
```

Having described the VAS data specification and the merchant VAS data specification above, FIG. 1 illustrates a flow diagram example of how the VAS data specification may incorporated in an example intended transaction of purchasing gasoline at a gas station pump.

Referring to FIG. 1, before the overall VAS data specification may be operable, at 102, a dialogue may be presented to determine whether a user is registered. In one example, this step may be performed shortly before the intended transaction is about to initiate or may be performed any time before the intended transaction is about to initiate. If the user has not registered, the user is guided from 104 through 116 to complete registration. For example, the user pairs his or her mobile device 230 with his or her vehicle 232. Device 230 may be a smart phone, a computer, a wireless communication device, a laptop computer, or other computing device. In this example, the pairing or coupling may be accomplished via a number of ways, such as wirelessly through a number of wireless signal specifications. The pairing or coupling may be accomplished through wired communications as well, such as via a USB connection.

At 106, after the pairing is established, vehicle specific data such as vehicle identification number VIN may be extracted from the vehicle 232. In one embodiment, the user may manually enter the vehicle information to the device 230. In another embodiment, the device 230 may communicate with a computing system of the vehicle 232. In some embodiments, the communication may be through a service port on the vehicle 232 such as, for example, an On-Board Diagnostic (OBD) II port. A reading device may be in communication with the OBD II port, extract the VIN or other vehicle data, and communicate with the device 230 or with a remote receiver directly. In other embodiments, a connection through a traditional computing port such as a USB port may be used to communicate with the vehicle's computing system to obtain the vehicle specific data (e.g., the VIN). In yet another embodiment, communication may be established wirelessly such as through a vehicle emergency system which may periodically communicate identifiable information. In some embodiments, the vehicle specific data, such as a VIN, may be stored in the mobile device 230 at 108.

At 110, confirmation of device pairing is made, and at 112, payment data or payment account information is entered. In one example, the payment data may be entered manually by the user (e.g., by tactile entries or voice entries), selected by the user on the mobile device 230 from existing entered data, or scanned by the mobile device 230. At 114, a token may be issued with private and public key stored. In some embodiments, the token is stored by the vehicle 232 and in other embodiments, the token is stored by device 230. For example, when it is time to pay, the device 230 may communicate with a payment network backend system 234 via a network to request a token. The backend system 234 may be a server, collection of servers, or other computing device. The system 234 may proceed through token generation and communicate the token to the device 230.

At 116, the user may enter loyalty account information as well as VAS offer opt-ins. In some embodiments, the loyalty account information may already be stored on the vehicle 232 and in other embodiments, an option may be displayed to store the loyalty information on the vehicle 232. In yet another embodiment, the mobile device 230 may be in communication with the vehicle 232 and device 230 may store the loyalty information and communicate it to the vehicle 232, a merchant POS terminal, or other remote computing device.

If the user was previously registered, the user may proceed to 118 to login to the mobile application installed on the mobile device 230. For example, the user may login to the mobile application via a number of ways, such as password, PIN, fingerprint scan, iris scan, or a combination of the above. Once logged in, the mobile application may monitor for messages sent from beacons or other merchant POS terminals that communicate (e.g., broadcast) information about the merchant. The merchant information may include offers for goods and/or services available for sale from a merchant. It is to be understood that once the user authentication is accomplished, the mobile application may initiate transmission of VAS data according to the VAS data specification.

At 120, a number of context-based offers may be presented to the user. In one example, the specification of the VAS data is implemented to enable the presentation of the VAS offers more smoothly and in a targeted manner. In this example, the VAS offer may be 25% off regular prices of a cup of coffee and a donut. For example, with the registration steps from 104-116, the VAS data specification builds a schema for offering VAS to the user. At the same time, merchants who employ the merchant VAS data into their POS system may be able to seamlessly provide VAS offers to the user without creating additional transaction hassles for the user. In one example, offers are presented on a display screen of the mobile device 230. In another example, offers are presented to one or more display devices integrated in the vehicle 232 such that the user could easy view and interact with the offers.

At 122, the user may have the option to select or accept the VAS offers. In one embodiment, the user may use a number of interactive ways to select or accept the offers. For example, the user may use voice commands or instructions received on touch-sensitive screens on the device or on the vehicle to provide the user's decision. In some embodiments, the user may be able to use the display in the vehicle or on the portable computing device to review additional offers, create a separate order or request more information.

At 124, the user may further receive a merchant specific user interface (UI). In one embodiment, the merchant specific mobile application or features may be invoked and provided to the user. At 126, the user may determine to purchase one or more of the VAS offers or would defer to add the VAS offer for later purchase or place an item in a shopping cart. If the user selects to purchase a VAS offer now, the user may proceed at 128 to select the purchase via a number of interactive means, such as by voice command or by instructions on the touch-sensitive screens on the vehicle/device. If the user elects to just add the VAS offer for later purchase, the user may proceed to add the VAS offer to a shopping cart at 130 and may apply additional points/ rewards to the cart before completing the purchase of the VAS offer.

It is to be understood that the intended transaction, e.g., purchase of gasoline at the pump in this example, is still processing. That is, the user may still be pumping the gas at the pump or be in a close proximity to a pump. In other words, the VAS offer is an additional incentive or offer that the user receives while the intended transaction is yet to be completed.

Once the user elects to purchase the VAS offer now (at 128) or have finished adding the VAS offer(s) to the cart (at 132), the VAS transaction is transmitted to the merchant at 134. In other words, the VAS transaction is now integrated or incorporated into the intended transaction as a single transaction for processing. As such, at 136, the user and/or the vehicle arrives at merchant or POS beacon sensing terminal. At this stage, the payment processes and order completion processes may occur substantially simultaneously. For example, at 138, the previously registered and stored tokens on the vehicle 232 are retrieved to initiate the payment data processing at the payment network. At 140, the payment data is transmitted to the merchant's POS system. The payment network transmits or pushes the payment to the merchant at 142 with the approval at 144, once approved. The merchant receives the payment with a confirmation at 146.

While the payment processes are proceeding, the order completion processes are also proceeding. For example, at 148, the merchant is notified of the user arrival. In one example, the notification may simply be as a result of the user walking to through the front door of the merchant's store or as a result of being sensed at a POS beacon 236 or other sensing terminals according to 136. At 150, the VAS transaction is tendered to the user to complete the order completion processes.

Thus, at 150, the user not only completes the intended transaction in this example, e.g., obtaining gas for the vehicle, but also completes the VAS offer, which, in the above example, may be 25% off the regular prices of a cup of coffee and a donut. It is to be understood that the VAS offer may by dynamically adjusted or tailored based on a number of factors, such as based on user's loyalty program/ account, availability of discounted or sale items, vehicle specific data, time of the day, etc. As such, due to the VAS data specification, to the user's purchasing experience, the user has just completed one single transaction with one payment processing. There are no additional payment transactions.

It is to be understood that the VAS data specification may be deployed and beneficial in other purchasing settings. For example, this purchasing experience is different from a user's typical dining experience in which the user appears to be able to "add" more meal items at one's meal because these were voluntary and specific choice by the user, and not in response to a VAS offer. Existing dining experience at a restaurant is viewed as having two parts: tendering of the selected meal item and the consumption of the selected meal item. As such, the completion of the transaction would be after the above two parts are completed. That is when the check is presented to the user at the restaurant. The take-out workflow eliminates the second part, the consumption step, at the restaurant, as the user would like to consume the meal item elsewhere. As such, any orders after the take-out order has completed, under the existing technology, would treat that as a separate order and the user would need to tender the payment for the separate order as a separate transaction.

In yet another example, a user may create an order for a restaurant while at a first location and the order may be completed at a second location. The user may fill up with gas and may create and order for food at a nearby restaurant. The system may communicate the order to the restaurant and the transaction may complete while at the gas station.

In another embodiment, an order may be created and communicated through the device 230. Once the user pulls up to the location to pick up the order, the payment details, including the vehicle VIN may be communicated by device 230 to merchant POS terminal and the transaction may then be completed.

In one embodiment, authentication may be performed at one or more steps as illustrated in FIG. 1. For example, authentication may take place at 108, 118, and 138.

Figure 2:
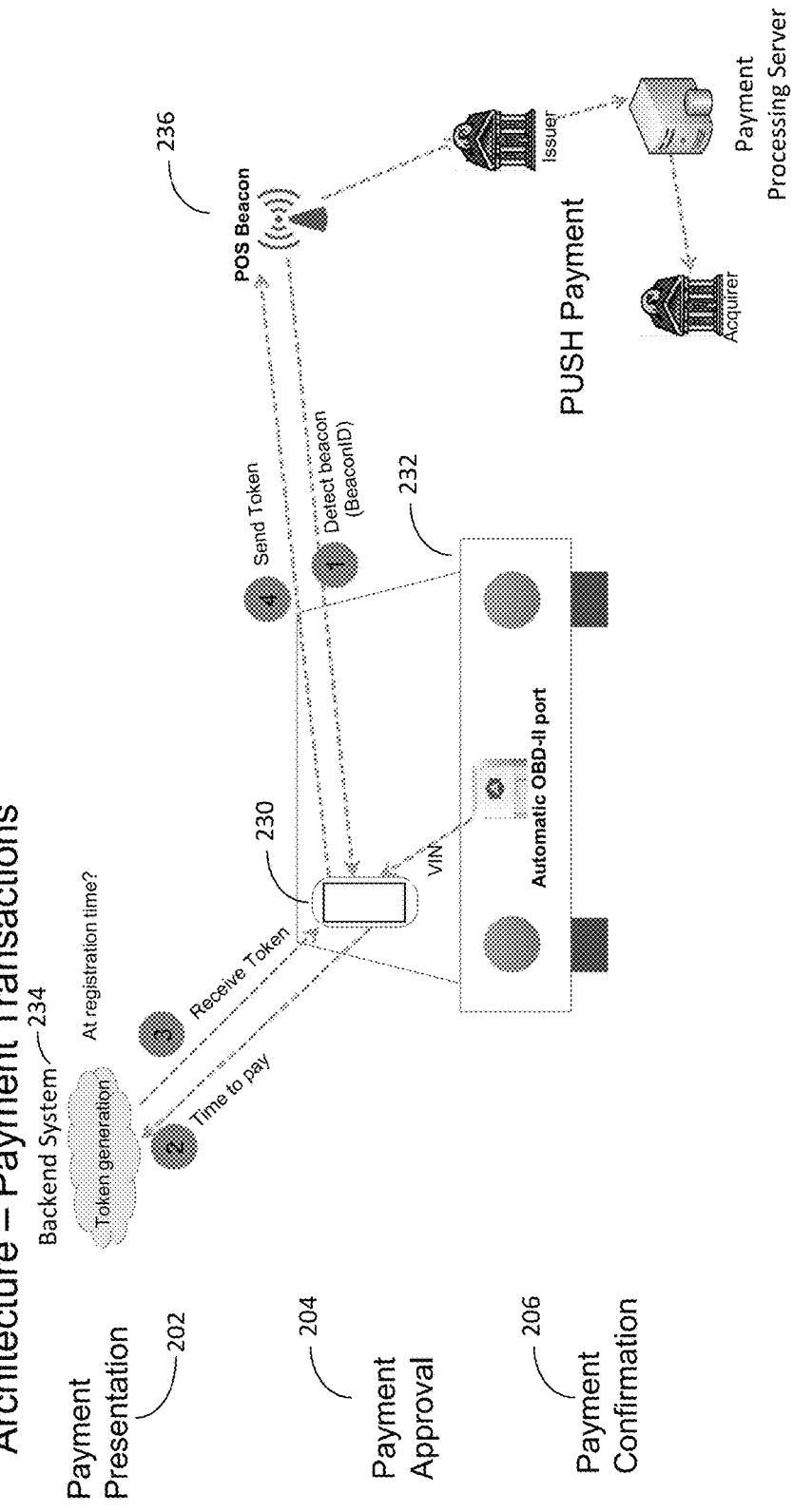
FIG. 2 is an exemplary payment transaction architecture according to one embodiment.

Referring to FIG. 2, a flow diagram illustrates an exemplary payment transaction architecture according to one embodiment. For example, the payment transaction architecture may be divided, for illustration purposes, into three stages: a payment presentation stage 202, a payment approval stage 204, and a payment confirmation stage 206. In one example, references to FIG. 2 may also be described in the context of 136 to 146 in FIG. 1. As a further illustration, the payment transaction architecture in FIG. 2 is based on an exemplary architecture established by VISA®. It is contemplated that modifications or adoptions of other payment transaction architecture are within the spirit and the scope of the invention.

For instance, a merchant POS terminal having a POS beacon 236 broadcasts signals such that the vehicle 232 and/or mobile device 230 receives merchant information (in compliance with the merchant VAS data specification). The mobile application of the mobile device 230 may be subsequently triggered to transition to the payment presentation stage 202 where tokens are authenticated and exchanged between the payment network backend system 234 and the mobile application. For example, when it is time to pay, the mobile device 230 may request a token from the backend system 234, which may respond with the requested token if the user and/or the mobile device 230 can be authenticated. Upon successful authentication, the mobile device 230 may communicate with the merchant's POS terminal at the payment approval stage 204. The merchant POS terminal next communicates and thereafter receives the payment at the payment confirmation stage 206. For example, the merchant POS terminal may communicate with a server (or other system), the user's issuing bank, a payment processing server, and an acquiring bank server to authorize payment.

Figure 3:
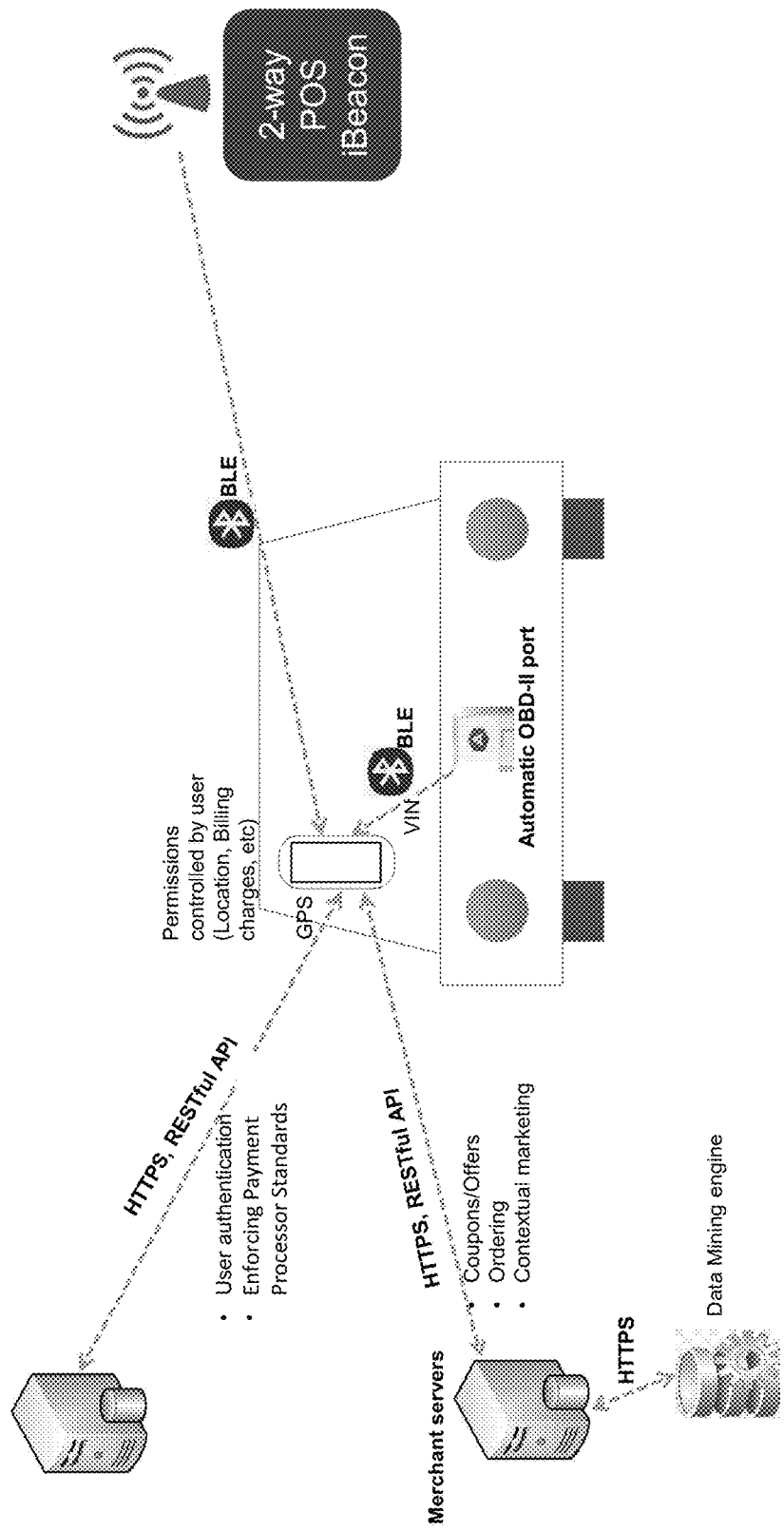
FIG. 3 is a diagram illustrating another payment transaction architecture according to one embodiment.

Referring now to FIG. 3, a diagram illustrates another payment transaction architecture according to one example embodiment. In this example, the VAS data specification may be implemented in an application program interface (API). For example, the VAS data is provided in a number of data fields as illustrated in Tables 1-5, A-1, B-1, C-1 and C-2 above. In one implementation, the VAS data may be implemented as part of Representational State Transfer (REST) services, or also known as RESTful services, and RESTful API. The transmission of the RESTful API may be done via HTTPS between the merchant, the payment network, and the user.

Figure 4:
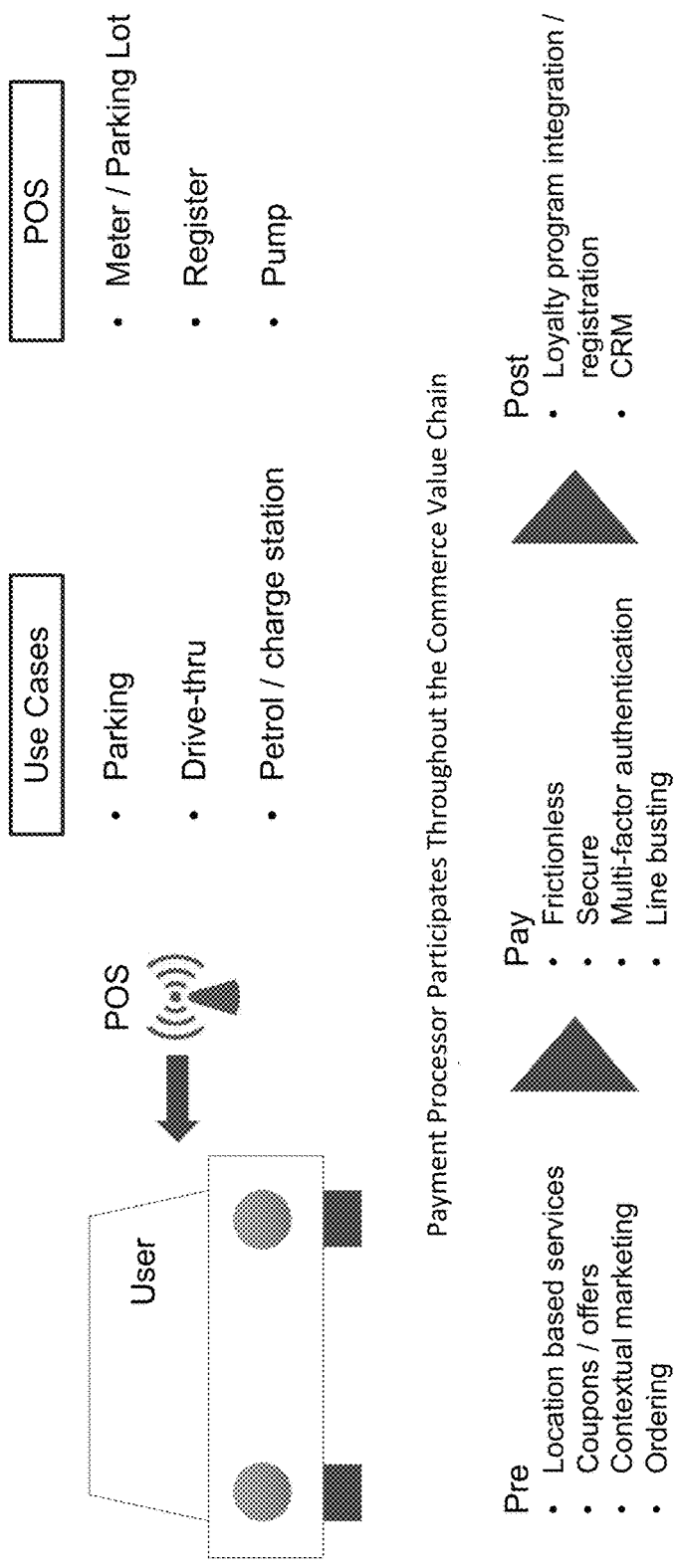
FIG. 4 is a diagram illustrating value-added services data transactions incorporating into a Point-of-Sale system according to one embodiment.

Referring now to FIG. 4, a diagram illustrates value-added services data transactions incorporated into a Point-of-Sale system according to one embodiment. As previously discussed, the VAS data specification (see also FIG. 1), coupled with vehicle specific data, provides a number of conveniences to users and merchants alike. The VAS data specification provides benefits in pre-payment stage, payment stages, and post-payment stage.

For example, during the pre-payment stage, the VAS data specification may provide VAS, such as location based services, coupons/offers, contextual marketing, targeted marketing, and ordering. During payment stage, the VAS may provide frictionless payment, secure payment, multi-factor authentication, and avoidance of line. During the post-payment stage, the VAS may provide loyalty program integration/registration for future purchases and other customer relationship management (CRM) services.

Moreover, in the embodiments with vehicle specific data being used as part of the overall VAS data, services and transactions relating to parking, drive-thru, gas station, charging station, order pickup, etc., may be used to provide value-added services to customers while increasing traffic and business for the merchants. The integration of the VAS data in POS terminals, such as parking meters, Point-of-Sale registers or cashiers, and pumps/charging stations may further expand the reach of the value-added services.

As an illustration of another example of the VAS data specification in practice, a user may wish to purchase grocery items while on his or her way home. After a user inputs such a desire to purchase grocery items before reaching the grocer, the mobile application may provide driving directions and traffic information to the user's vehicle 232. The user may also authenticate his or her account with the mobile application. Once authenticated, VAS data provided to the merchant may include the user's loyalty program account, and the merchant, via the merchant VAS data specification, provides an array of goods for purchase, in addition to value-added services to the user, such as frequently purchased items, etc. As such, the user may quickly accept the offer to purchase frequently purchased items before reaching the grocer.

At the grocer's parking lot, a parking beacon 236 or other receiving terminal may receive the user's vehicle specific data and inform the merchant POS not only to complete the transaction but also alert the POS register staff that the user's purchased items are ready to be delivered to the specific parking space where the user has just parked. The user may then complete the transaction quickly and return home. It is to be understood that the receiving terminal may be a standalone device, such as a beacon broadcasting device, a POS device, or a combination of a beacon broadcasting device and a POS device.

The following provides an example embodiment where a user pulls into a store, such as a gas station. In an example, a user may drive and place vehicle 232 in park. Being in park may trigger the mobile application and/or a vehicle-based application to search for a beacon and/or to determine a geo-location of the vehicle 232 (e.g. based on GPS coordinates). For example, the vehicle-based application may determine what merchants are nearby based on the determined geo-location and/or any identified beacons. The below example describes operation of the vehicle-based application, but the operations may also be performed by the mobile application independently or in conjunction with the vehicle-based application.

Based on the determined nearby merchants, the vehicle-based application may determine what vehicle specific data to retrieve. For example, nearby merchant POS terminals may broadcast offers relating to certain vehicle specific data and the vehicle-based application may retrieve the vehicle specific data. For instance, a gas station merchant POS terminal may broadcast offers relating to fuel and the vehicle-based application may retrieve vehicle specific data indicating a current fuel level for vehicle 232. The POS terminal may interact with the vehicle-based application to determine how much fuel is needed to fill up the vehicle 232. Additionally, the gas station merchant POS terminal may broadcast VAS offers for items available in a convenience store and/or for vehicle service (e.g., oil change, tire pressure, etc.).

The vehicle-based application may present the VAS offers in an in-dash graphical user interface for the user to select whether to make a purchase. In some examples, the gas station merchant POS terminal may tailor VAS offers to a user based on the user's purchase history, vehicle type, time of day, day of week, route, road conditions, and the like. Such information may be stored by the vehicle 232, the gas station merchant POS terminal, and/or at other location. The gas station merchant POS terminal may process the user's purchase history to determine what types of products and/or services the customer bought in the past. The gas station merchant POS terminal may also determine what time of day and on what day of the week the customer made the purchases.

Based on the user's purchase history, the gas station merchant POS terminal may select at least one VAS offer to present to the customer. To do so, the gas station merchant POS terminal may access a VAS offers database listing some or all products and/or services that are for sale, and may select one or more offers to present to the user. For example, the gas station merchant POS terminal may process the user's purchase history to determine that a customer only purchases coffee in the afternoon, but not in the morning or evening. The gas station merchant POS terminal may select a VAS offer to buy coffee in addition to gas when a user arrives at gas station in the afternoon. The user may add coffee to the order, and the vehicle-based application may communicate the addition to the order. Advantageously, this example embodiment may not require pre-authorization of a user's credit card prior to buying fuel, and thus there are no "blocks" or "holds" placed on the user's account. This is due to the fact that the user pre-pays for the amount of gasoline needed, as determined based on the vehicle specific data, and thus a hold on the user's account is not required.

The example embodiments are also applicable when paying for parking. In an example, when a user pulls vehicle 232 into a parking spot, the vehicle-based application may detect a beacon 236 (or geo-fence) and thus trigger the vehicle-based application to receive merchant data from the beacon to initiate a parking session. The parking session may remain active until the vehicle 232 leaves the spot and moves out of range from the beacon 236. The vehicle-based application may also or alternatively prompt the user to select how long he or she would like to park when the vehicle 232 is pulled into a parking space.

In another parking example, the example embodiments may be used to alert a merchant about the presence of a customer. For instance, when a user pulls vehicle 232 into a parking spot, the vehicle-based application may detect a beacon 236 (or geo-fence) and thus trigger the vehicle-based application to alert the merchant that the user has arrived. The vehicle-based application may be used to complete an intended transaction and may coordinate with the merchant's POS terminal to accept one or more offers for additional goods and/or services. For example, a user may drive vehicle 232 to retrieve a carry-out order for pizza. When finished parking, the vehicle-based application may provide the user with VAS offers for additional merchandise (e.g., add a beverage to the order) prior to completing the intended transaction and add any accepted VAS to the order. The vehicle-based application may also coordinate with the merchant's POS terminal to assist delivery of the purchased item. For example, the vehicle-based application may retrieve vehicle specific data for communication to the merchant's POS terminal such as, for example, a make, model, and color of the vehicle 232. An employee may bring out the pizza and beverage to the user's vehicle 232 aided, for example, by being informed of the make, model, and color.

In a further example, the mobile application may permit merchants to compete for a user's business. In an example, the mobile application may periodically retrieve and send the vehicle specific data to solicit offers from merchants. For example, the mobile application may process the vehicle specific data to determine that a vehicle's tire is low and may solicit offers from service stations. The mobile application may present the offers in, for example, a descending order based on price. Should the vehicle 232 break down or otherwise require servicing, the mobile application may also process the vehicle specific data and solicit offers from tow truck companies and/or service stations. For example, the vehicle specific data may indicate that vehicle 232 has a particular broken part, and the mobile application may solicit repair bids from service companies having that part in stock.

In yet another example, the mobile application may solicit for offers along a route to a destination. For instance, the mobile application may prompt the user to input a destination, and the mobile application may solicit offers from merchants along the route for presentation to the user.

The example embodiments may also be used for detecting fraud. The mobile application may communicate geo-location data and the vehicle specific data to a payment processing server. The server may assess transaction risk based on the user's typical routes and whether the received vehicle specific data corresponds to a vehicle associated with the user.

Figure 5:
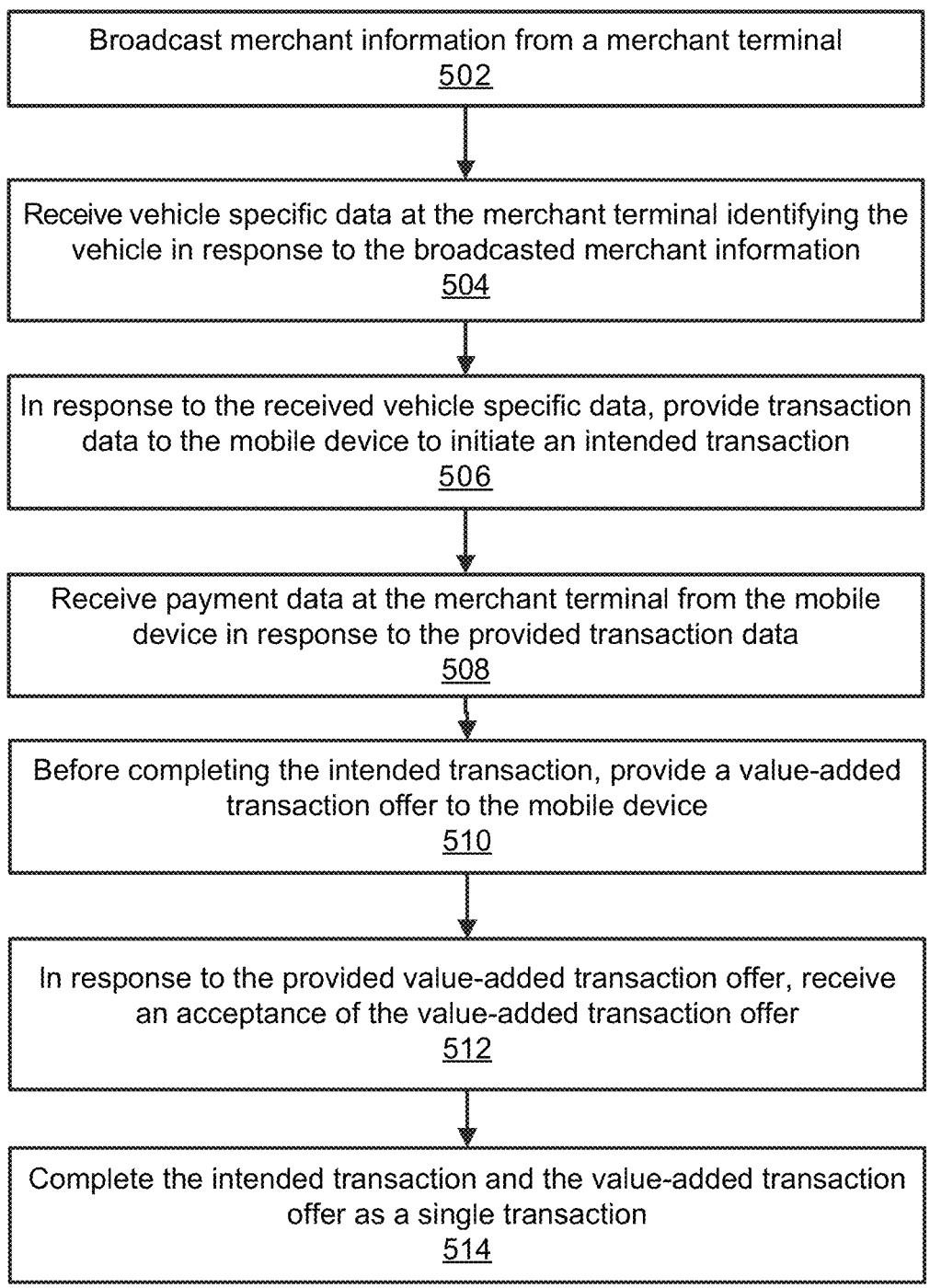
FIG. 5 illustrates a flow diagram of a method according to one embodiment.

FIG. 5 illustrates a flow diagram of a method in accordance with example embodiments. The flow diagram may be implemented by a system or apparatus, such as, for example, a merchant's point of sale terminal or a server associated with a merchant. Each of the blocks shown in the flow diagram may be repeated one or more times, one or more of the blocks may be modified, and one or more of the blocks may be omitted. The method may be stored on a non-transitory computer readable medium as computer executable instructions. The computer executable instructions, when executed by at least one processor, may cause the at least one processor, at least one computer, or other device to perform the blocks as steps of a method one or more times. The flow diagram may begin at block 502.

In block 502, the method may include broadcasting merchant information from a merchant terminal. In an example, a merchant may have a merchant point of sale terminal with a signal emitting device, such as a beacon, for broadcasting merchant information about the merchant, a receiver for receiving data from the device 230, and a processor configured to execute computer-executable instructions to perform the functions described herein. Broadcasting may occur via at least one of the following: an iBeacon, a Wi-Fi signal, a cellular signal; and an RF signal. Other types of broadcasting may also be used. The beacon may transmit over a fixed distance and also may broadcast over a cellular or other wide area network. The merchant information may include offers for goods and/or services that can be purchased from the merchant. The user may drive the vehicle 232 and the mobile device 230 may receive the broadcast merchant information when within range of the beacon and/or based on a current geo-location of the device 230. In some examples, the vehicle 232 may have to be placed into park prior to receiving and/or processing any broadcast. A receiver may include any communication device configured for receiving a signal via a wired or wireless connection.

In block 504, the method may include receiving vehicle specific data at the merchant terminal identifying the vehicle in response to the broadcasted merchant information. In an example, the mobile application of device 230 may communicate vehicle specific data to the merchant POS terminal. For example, the vehicle specific data may include one or more of the vehicle's VIN, current fuel level, make, model, year, any safety faults (e.g., low tire pressure), and the like. The mobile device 230 receive the vehicle specific data from the vehicle 232 via a port in communication with an electronic system of the vehicle and/or a maintenance port on the vehicle (e.g., an OMD II port). The device 230 may also communicate with an electronic system wirelessly or via a wired connection to retrieve the vehicle specific data. To protect the vehicle specific data, the mobile application may generate a unique electronic signature by electronically signing the vehicle specific data using, for example, a private key in public key cryptography.

In block 506, the method may include providing transaction data to the mobile device to initiate an intended transaction in response to the received vehicle specific data. In an example, the merchant POS terminal may identify one or more products and/or services to offer to the customer. For instance, the merchant may be a gas station and the merchant terminal may submit an offer to the mobile device 230 to buy gas based on the vehicle's current fuel level. The offer may include transaction data to initiate an intended transaction. The transaction data may include one or more data fields. For example, the merchant terminal may detect that the current fuel level is 2.8 gallons, and process the vehicle specific data to determine that a fuel tank of the vehicle 232 holds 16 gallons of fuel. The offer may include transaction data having a data field with an offer for initiating purchase of 13.2 gallons of fuel (e.g., 16−2.8=13.2).

In block 508, the method may include receiving payment data at the merchant terminal from the mobile device in response to the provided transaction data. In an example, a user may provide input to the mobile device 230 accepting the offer for fuel and the mobile application may communicate payment data (e.g., retrieve a token previously stored by device 230 or vehicle 232, credit card data, etc.) to the merchant terminal. The payment data may include one or more fields. For example, the payment data may include a field that contains a unique identifier of the mobile device, a field that contains a payment account identifier (e.g., credit card data), a field that contains consumer intent data, and the like. The consumer intent may indicate, for example, intent to pay with points or rewards, or intent to redeem card-linked offers in the intended transaction.

In block 510, the method may include providing a value-added transaction offer to the mobile device before completing the intended transaction. In an example, the merchant terminal may receive the payment data and may select a value-added transaction to present to the mobile device before completing the intended transaction. For example, the merchant terminal may access a database of available value-added transaction offers. The merchant terminal may select one of the value-added transaction offers based on one or more factors. Example factors may include the user's purchase history, vehicle-based needs (e.g., to fix a safety fault), time of day, day of week, and the like. The merchant terminal may select at least one value-added transaction offer and communicate the one or more selected offers to the mobile device 230. For example, the merchant terminal may communicate VAS data including one or more fields that each correspond to the selected offers. The VAS data may also include an employee identifier data field.

In block 512, the method may include receiving an acceptance of the value-added transaction offer in response to the provided value-added transaction offer. In an example, the mobile application may cause device 230 or vehicle 232 to present the value-added transaction offer to the user. Presentation may include visual and/or audible presentation in, for example, a graphical user interface (GUI). The GUI may be presented on a display screen of device 230 and/or of vehicle 232. The user may provide input accepting a value-added transaction offer and the mobile application may communicate an acceptance of the value-added transaction offer.

In block 514, the method may include completing the intended transaction and the value-added transaction offer as a single transaction. In an example, in response to receiving the acceptance, the merchant POS terminal may generate an authorization message requesting authorization from a payment processing network to complete a payment transaction for both the intended transaction and the value-added transaction offer. In an example, a single transaction may constitute sending a single payment authorization request message via a payment processing network.

The method of FIG. 5 may return to any of the blocks, may repeat one or more times, and/or may end.

Advantageously, the example embodiments may provide technical solutions to technical challenges. For example, conventional systems have failed to leverage vehicle specific data for presenting value-added offers to users and adding such offers to an intended transaction. One such advantage is that the example embodiments may complete both the intended transaction and the value-added offer as part of a single transaction, thus providing the technical benefit of reduced data traffic on the payment processing network.

The example embodiments may be implemented on computers and servers such as, for example, general purpose computers that may have, among other elements, a microprocessor (such as from the Intel Corporation, AMD or Motorola); volatile and non-volatile memory; one or more mass storage devices (i.e., a hard drive); various user input devices, such as a mouse, a keyboard, or a microphone; and a video display system. The computers, servers, terminals, and other devices described herein may be running on any one of many operating systems including, but not limited to WINDOWS, UNIX, LINUX, MAC OS, or Windows (XP, VISTA, etc.). It is contemplated, however, that any suitable operating system may be used for the present invention. The computers, servers, terminals, and other devices described herein may be a cluster of web servers, which may each be LINUX based and supported by a load balancer that decides which of the cluster of web servers should process a request based upon the current request-load of the available server(s).

The computers, servers, terminals, and other devices described herein may be connected via networks, including the Internet, WAN, LAN, Wi-Fi, other computer networks (now known or invented in the future), and/or any combination of the foregoing. It should be understood by those of ordinary skill in the art having the present specification, drawings, and claims before them that networks may connect the various components over any combination of wired and wireless conduits, including copper, fiber optic, microwaves, and other forms of radio frequency, electrical and/or optical communication techniques. It should also be understood that any network may be connected to any other network in a different manner. The interconnections between computers, servers, terminals, and other devices described herein are examples. Any device may communicate with any other device via one or more networks.

The example embodiments may include additional devices and networks beyond those disclosed. Further, the functionality described as being performed by one device may be distributed and performed by two or more devices. Multiple devices may also be combined into a single device, which may perform the functionality of the combined devices.

The various participants and elements described herein may operate one or more computer apparatuses to facilitate the functions described herein. Any of the elements in the above-described figures, including any computers, servers, terminals, or databases, may use any suitable number of subsystems to facilitate the functions described herein.

Any of the software components or functions described in this application, may be implemented as software code or computer readable instructions that may be executed by at least one processor using any suitable computer language such as, for example, Java, C++, or Perl using, for example, conventional or object-oriented techniques.

The software code may be stored as a series of instructions or commands on a non-transitory computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus and may be present on or within different computational apparatuses within a system or network.

It may be understood that the present invention as described above can be implemented in the form of control logic using computer software in a modular or integrated manner. Based on the disclosure and teachings provided herein, a person of ordinary skill in the art may know and appreciate other ways and/or methods to implement the present invention using hardware, software, or a combination of hardware and software.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more of the elements of the present system may be claimed as means for accomplishing a particular function. Where such means-plus-function elements are used to describe certain elements of a claimed system it will be understood by those of ordinary skill in the art having the present specification, figures and claims before them, that the corresponding structure is a general purpose computer, processor, or microprocessor (as the case may be) programmed to perform the particularly recited function using functionality found in any general purpose computer without special programming and/or by implementing one or more algorithms to achieve the recited functionality. As would be understood by those of ordinary skill in the art that algorithm may be expressed within this disclosure as a mathematical formula, a flow chart, a narrative, and/or in any other manner that provides sufficient structure for those of ordinary skill in the art to implement the recited process and its equivalents.

While the present disclosure may be embodied in many different forms, the drawings and discussion are presented with the understanding that the present disclosure is an exemplification of the principles of one or more inventions and is not intended to limit any one of the inventions to the embodiments illustrated.

The present disclosure provides a solution to the long-felt need described above. In particular, systems and methods described herein may be configured to permit making of payments using a vehicle. Further advantages and modifications of the above described system and method will readily occur to those skilled in the art. The disclosure, in its broader aspects, is therefore not limited to the specific details, representative system and methods, and illustrative examples shown and described above. Various modifications and variations can be made to the above specification without departing from the scope or spirit of the present disclosure, and it is intended that the present disclosure covers all such modifications and variations provided they come within the scope of the following claims and their equivalents.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Embodiments of the invention may be implemented with computer-executable instructions. The computer-executable instructions may be organized into one or more computer-executable components or modules. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

One or more features from any embodiment may be combined with one or more features of any other embodiment without departing from the scope of the invention. When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements. Recitation of "and/or" is intended to represent the most inclusive sense of the term unless specifically indicated to the contrary.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A computer-implemented method for enabling a value-added transaction involving a vehicle and a merchant via a mobile device, the computer-implemented method comprising:

broadcasting merchant information from a merchant terminal via a wireless signal, said merchant terminal comprising a point-of-sale device for processing a vehicle-based intended transaction and the value-added transaction;

wherein the mobile device is configured to receive and process the wireless signal via a software program installed thereon;

receiving, at the merchant terminal, a data packet via the wireless signal generated by the mobile device in response to the broadcasted merchant information, wherein the data packet includes the merchant information and vehicle specific data received by the mobile device from an on-board diagnostic portal of the vehicle, wherein the mobile device, via the software program, is in communication with the on-board diagnostic portal of the vehicle, said mobile device being a separate device from the vehicle;

wherein the mobile device is configured to receive payment data from a user via input interfaces of the mobile device;

triggered by the received vehicle specific data in the data packet, providing, by the merchant terminal, transaction data to the mobile device to initiate the vehicle-based intended transaction, said vehicle-based intended transaction comprising at least one of the following: parking, drive-thru, gas station, charging station, and order pickup;

in response to the provided transaction data of the vehicle-based intended transaction, exchanging between a payment network server and the mobile device an authentication token to authenticate the vehicle-based intended transaction;

receiving payment data, from the mobile device, in the data packet with the authentication token and the vehicle specific data at the merchant terminal in response to the provided transaction data;

before completing the intended transaction, by the payment network server, determining additional data of a value-added transaction offer to be transmitted to the mobile device, said value-added transaction offer being a non-vehicle-based transaction offer;

transmitting, from the payment network server, to the mobile device the additional data of the value-added transaction offer;

in response to the transmitted additional data with the value-added transaction offer, receiving an acceptance of the value-added transaction offer in the data packet from the mobile device; and completing, by the merchant terminal, the intended transaction and the value-added transaction offer as a single transaction when processing the data packet.

2. The computer-implemented method of claim 1, wherein broadcasting comprises broadcasting via at least one of the following: an iBeacon, a Wi-Fi signal, a cellular signal, and an RF signal.

3. The computer-implemented method of claim 1, wherein the vehicle specific data comprises a vehicle identification number (VIN) of the vehicle.

4. The computer-implemented method of claim 1, wherein generating the vehicle specific data comprises generating a unique electronic signature.

5. The computer-implemented method of claim 1, wherein receiving the payment data comprises receiving a unique identifier of the mobile device.

6. The computer-implemented method of claim 1, wherein the mobile device receives the vehicle specific data from one of the following: a port in communication with an electronic system of the vehicle and a maintenance port of the vehicle.

7. The computer-implemented method of claim 6, wherein the maintenance port is an on-board diagnostic II port.

8. The computer-implemented method of claim 1, wherein receiving payment data comprises receiving credit card data.

9. The computer-implemented method of claim 1, wherein providing the transaction data to the mobile device comprises providing the transaction data to a display disposed on the vehicle.

10. A system for enabling value-added transaction involving a vehicle and a merchant via a mobile device, the system comprising:
    a wireless signal emitting device of a merchant configured for broadcasting merchant information via a wireless signal, said wireless signal emitting device comprising a point-of-sale device for processing a vehicle-based intended transaction and the value-added transaction;
    wherein the mobile device is configured to receive and process the wireless signal via a software program installed thereon;
    wherein the wireless signal emitting device of the merchant is configured for receiving a data packet via the wireless signal generated by the mobile device in response to the broadcasted merchant information, wherein the data packet includes the merchant information and vehicle specific data identifying the vehicle, received by the mobile device from an on-board diagnostic portal of the vehicle, said mobile device being a separate device from the vehicle;
    wherein the mobile device is configured to receive payment data from a user via input interfaces of the mobile device; and
    a processor in communication with the wireless signal emitting device and being configured for executing computer-executable instructions to provide transaction data to the mobile device to initiate the vehicle-based intended transaction triggered by the vehicle specific data, said vehicle-based intended transaction comprising at least one of the following: parking, drive-thru, gas station, charging station, and order pickup;
    wherein, in response to the provided transaction data of the vehicle-based intended transaction, the processor is configured for exchanging an authentication token with the mobile device to authenticate the vehicle-based intended transaction;
    wherein the wireless signal emitting device is configured for receiving payment data in the data packet with the authentication token and the vehicle specific data from the mobile device in response to the provided transaction data;
    wherein the processor is configured for executing the computer-executable instructions to determine additional data of a value-added transaction offer to be transmitted to the mobile device, said value-added transaction offer being a non-vehicle-based transaction offer;
    wherein the processor is configured to transmit to the mobile device the additional data of the value-added transaction offer;
    wherein the wireless signal emitting device is configured for receiving an acceptance of the value-added transaction offer in the data packet from the mobile device in response to the provided value-added transaction offer; and
    wherein the processor is configured for executing the computer-executable instructions to process the data packet to complete the intended transaction and the value-added transaction offer as a single transaction.

11. The system of claim 10, wherein the signal emitting device is configured for receiving broadcasting the merchant information via at least one of the following: an iBeacon, a Wi-Fi signal, a cellular signal, and an RF signal.

12. The system of claim 10, wherein e mobile device is configured for receiving a vehicle identification number (VIN) of the vehicle.

13. The system of claim 10, wherein the mobile device is configured for receiving a unique electronic signature.

14. The system of claim 10, wherein the mobile device is configured for receiving a unique identifier of the mobile device.

15. The system of claim 10, wherein the mobile device is configured for receiving credit card data.

16. The system of claim 10, wherein the processor is configured for providing the transaction data to a display disposed on the vehicle.

17. A non-transitory computer-readable medium stored thereon computer-executable instructions for enabling a value-added transaction involving a vehicle and a merchant via a mobile device, the computer-executable instructions comprising:
    broadcasting, by and from a merchant terminal, merchant information via a wireless signal, said merchant terminal comprising a point-of-sale device for processing a vehicle-based intended transaction and the value-added transaction;
    wherein the mobile device is configured to receive and process the wireless signal via a software program installed thereon;
    receiving, at the merchant terminal, a data packet via the wireless signal generated by the mobile device in response to the broadcasted merchant information, wherein the data packet includes the merchant information and vehicle specific data, received by the mobile device from an on-board diagnostic portal of the vehicle, said mobile device being a separate device from the vehicle;
    wherein the mobile device is configured to receive payment data from a user via input interfaces of the mobile device;
    triggered by the received vehicle specific data in the data packet, providing transaction data to the mobile device to initiate the vehicle-based intended transaction, said vehicle-based intended transaction comprising at least one of the following: parking, drive-thru, gas station, charging station, and order pickup;
    in response to the provided transaction data of the vehicle-based intended transaction, exchanging between a payment network server and the mobile device an authentication token to authenticate the vehicle-based intended transaction;
    receiving payment data at the merchant terminal from the mobile device, in the data packet with the authentication token and the vehicle specific data in response to the provided transaction data;

before completing the intended transaction, by the payment network server, determining additional data of a value-added transaction offer to be transmitted to the mobile device, said value-added transaction offer being a non-vehicle-based transaction offer;

transmitting to the mobile device the additional data of the value-added transaction offer;

in response to the transmitted additional data with the value-added transaction data, receiving an acceptance of a value-added transaction offer specified in the offer data field of the data packet from the mobile device; and completing, by the merchant terminal, the intended transaction and the value-added transaction offer as a single transaction when processing the data packet.

18. The non-transitory computer-readable medium of claim 17, wherein the value-added transaction offer comprises an employee identifier data field.

19. The non-transitory computer-readable medium of claim 17, further comprising receiving loyalty account information from the mobile device.

20. The non-transitory computer-readable medium of claim 17, wherein receiving payment data comprises receiving the payment data indicative of one of the following in a consumer intent data field: intent to pay with points or rewards or intent to redeem card-linked offers in the intended transaction.

* * * * *